United States Patent Office 3,527,700
Patented Sept. 8, 1970

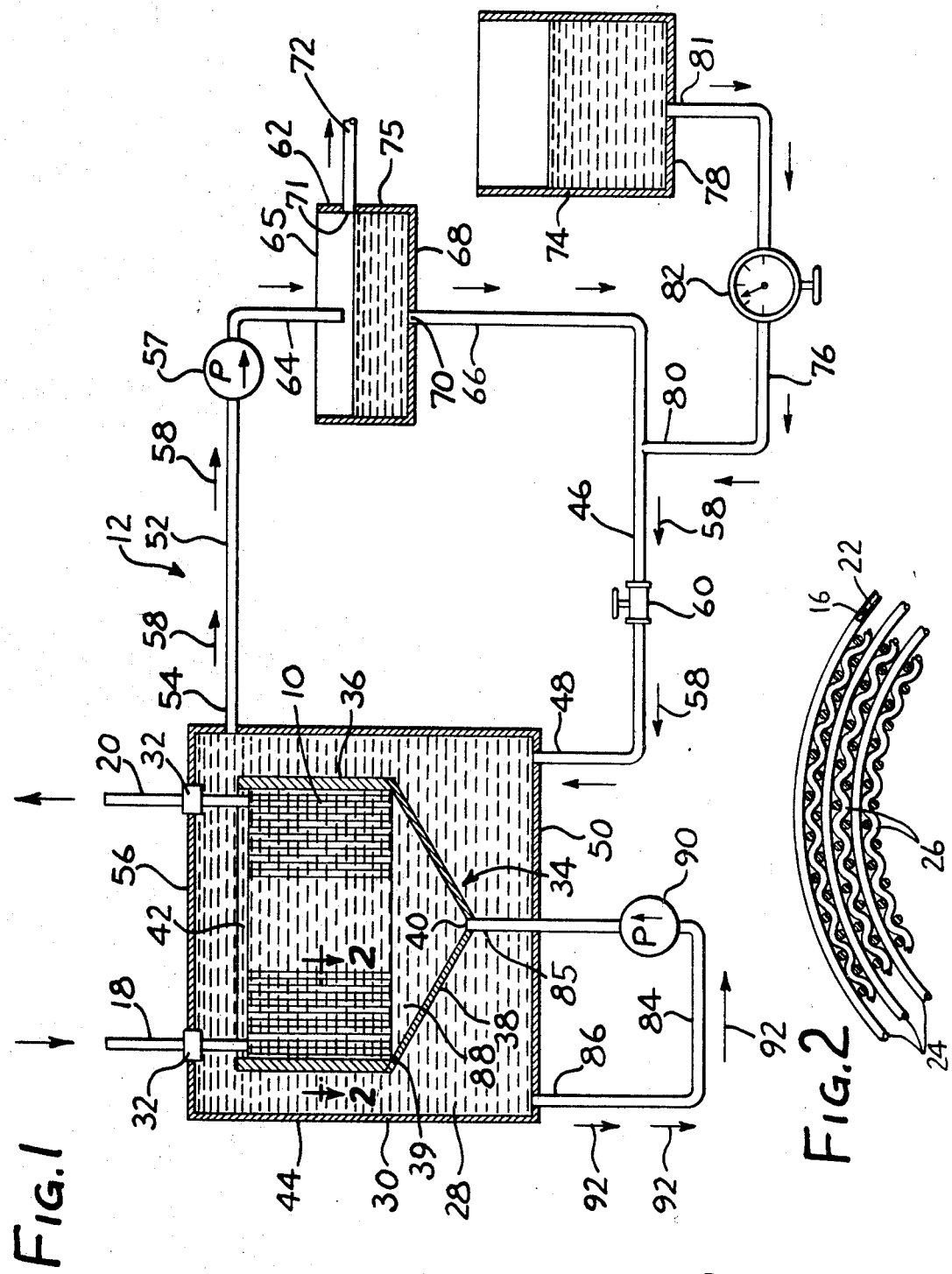

3,527,700
DIALYSIS FLUID RECIRCULATION PROCESS AND APPARATUS
Richard Goldhaber, Evanston, Ill., assignor to Baxter Laboratories, Inc., Morton Grove, Ill., a corporation of Delaware
Filed June 6, 1968, Ser. No. 735,144
Int. Cl. B01d *13/00*
U.S. Cl. 210—22                                   21 Claims

ABSTRACT OF THE DISCLOSURE

A wash fluid is moved across one surface of a selectively permeable membrane under a selectively adjustable negative pressure to effect ultrafiltration and dialysis relative another fluid disposed on the other side of said membrane. A portion of the effluent is wasted and the remainder together with a volume of fresh dialyzing fluid equal to the wasted portion and selectively proportioned independently of the negative pressure provide influent.

---

The present invention relates to transfer of material through a membrane. Particularly the invention relates to dialysis and ultrafiltration. Specifically the invention relates to an artificial kidney.

Many problems attendant material transfer across a membrane concern an artificial kidney because it comprises a membranous member which preferably is a dialyzer and an ultrafilter. That is to say, an effective artificial kidney is adapted to rid extracorporeally circulated blood of solutes by dialysis and water by ultrafiltration. To minimize traumatization to treated blood both functions are conventionally simultaneously performed across a single membrane. Relative the present invention, essentially two classes of artificial kidney systems have evolved.

In a system of the first class, a wash fluid comprising dialysate is moved over a membranous array comprising an artificial kidney in a single pass under negative pressure and then discarded. A negative pressure system is highly desirable because satisfactory ultrafiltration can be effected without a blood pump. For developing the negative pressure a pump is disposed in the flow path downstream of the membranous array, that is in the effluent path. While a conventional negative pressure system minimizes traumatization to blood in effecting ultrafiltration, it is disadvantageous because it is exceedingly wasteful of dialyzing fluid. No practical prior method, system, apparatus or device has been conceived for dialysate recirculation or conservation in a negative pressure system. As used herein negative pressure means less than atmospheric pressure.

In a system of the second class dialyzing fluid is somewhat conserved by agitating portions of dialysate adjacent the membranous member of an artificial kidney but no portion of effluent is conserved or recirculated. Flow of wash fluid in a system of the second class is positively effected by pressure applied through a pump which is disposed upstream of an artificial kidney comprising such system.

In neither prior system are both fluid pressure and the quantity of fresh fluid for dialysis effectively independently variable. That is to say, in a system of the first class fluid pressure and the rate of addition of fresh dialyzing fluid are direct functions each of the other, while in a system of the second class the fluid pressure remains essentially constant. In that sense, the efficiency of prior systems is less than ideal because there is no direct relationship between excess water in blood and the quantity of excess solutes therein. Removal of excess water from blood is a function of the liquid pressure gradient across the membrane of an artificial kidney. On the other hand solute removal is dependent on its concentration gradient across the membrane. Accordingly, preferably, fluid pressure in the system and solute concentration in the dialysate should be independently controllable.

How to combine prior teachings to provide preferable apparatus, that is, having means for conserving wash fluid by recirculating portions of effluent in a negative pressure with independent control for fluid pressure and rate of addition of fresh dialyzing fluid is not remotely suggested in the prior art.

It is an object of the present invention to provide an improved process and fluid system for passing material across a membrane.

It is another object of the invention to provide an improved combination dialyzing and ultrafiltration process and apparatus.

It is an additional object of the invention to provide an improved artificial kidney and system therefor.

It is a further object of the invention to provide a circulatory system for an artificial kidney in which wash fluid is moved under negative pressure.

A yet further object of the invention is to conserve dialyzing fluid in dialyzing apparatus.

A still further object of the invention is to control independently (1) the pressure differential between a wash fluid and blood and (2) the volume of fresh dialyzing fluid added to the wash fluid, in a circulatory system for an ultrafilter and dialyzer such as an artificial kidney.

To effect the foregoing objects, means are adapted for circulating wash fluid on one side of a selectively permeable membrane to collect material passed through said membrane from another fluid moving along the other side of said membrane in a material passing device. Additionally means are provided for wasting a portion of spent wash fluid from, and returning the remainder thereof to, the circulating means. Means are provided for adding a fresh wash fluid to the circulating means and corresponding in volume to the portion of spent wash fluid wasted. Furthermore, means are provided for: (1) varying the volume of fresh wash fluid added to the circulating means at any pressure, and (2) varying the pressure at any rate of addition of fresh wash fluid.

How to further effect the foregoing and other objects, features and advantages of the invention will become more apparent upon consideration of the following description and appended claims, when considered in conjunction with the accompanying drawings wherein the same reference character of numeral refers to like or corresponding parts throughout the several views.

On the drawings:
FIG. 1 is a scheme of an artificial kidney and circulatory system therefor.
FIG. 2 is a section according to the line 2—2 of FIG. 1.

Referring now more particularly to the drawings, a device for passing material from one side to the other side of a selectively permeable membrane herein is embodied in a hemodialyzer such as an artificial kidney 10 which is part of an assembly including fluid circulating means generally designated 12. Kidney 10, as in the illustrated embodiment, may be formed in a coil and constructed according to copending U.S. Pat. application Ser. No. 582,896, filed Sept. 29, 1966, now abandoned, and assigned to the assignee of the present application. Although, for the most part, specific details of construction of the kidney are not critical to the invention, it does provide a suitable membrane 16 for ultrafiltering and dialyzing blood.

The latter, if in the form shown, is a tubular member 22 which is arranged in convolutions 24 to form a coil having opposite ends suitably connected to an inlet duct 18 and a return duct 20. Ducts 18 and 20 together with tubular member 22 comprise means defining a closed path for moving a first fluid or material, such as blood, on one side (being through the lumen of tubular member 22) of membrane 16. A support member 26 herein shown as comprising crossed strands is disposed between convolutions 24 and provides therebetween a path for passing a wash or dialyzing fluid on the other side (being along the outer surface of tubular member 22) of membrane 16.

Kidney 10 is disposed in a medial portion of a dialyzing chamber 28 which is defined by a fluid tight container 30, sealed except for intentional communication to the outside. A pair of spaced apart bearings 32 are arranged in the top wall 56 of container 30 for passing ducts 18 and 20 into chamber 28 from the exterior in a fluid tight seal to enable extracorporeal blood treatment within and blood return from container 30.

Kidney 10 is supported in a housing or canister 34 having an upper opening 42 and a cylindrical upper wall 36 from the bottom of which an inverted lower integral conical wall section 38 extends downwardly. Housing 34 is disposed in chamber 28 with its wall 36 preferably in concentric association with a sidewall 44 which comprises container 30. The proportioning of the parts is such that the kidney is supported from below by an annulus 39 of the upper end portion of the conical section 38 and in spaced relation from port 40 formed in the apex or lower end of wall section 38 between which and said kidney a chamber 88 is defined. Moreover, kidney 10 is held against annulus 39 by a suitable retainer omitted from the drawings in the interest of clarity.

An influent or inlet conduit 46 is provided for delivering wash fluid to container 30. To that end the downstream end portion 48 of conduit 46 is arranged in fluid communication with chamber 28 by reason of passage in a fluid tight seal through the bottom wall 50 of container 30 adjacent wall 44. An effluent or outlet conduit 52 is provided for receiving spent wash fluid from container 30. To that end an upstream end portion 54 of conduit 52 is arranged in fluid communication with chamber 28 by reason of passage in a fluid tight seal through sidewall 44 adjacent top wall 56 of container 30. The arrangement is such that the influent and effluent conduits are disposed in downstream-upstream association and may be considered, respectively, as being downstream and upstream of the kidney which is disposed medially of container walls 50 and 56.

Influent and effluent conduits 46 and 52 together with container 30 comprise means for circulating wash fluid on the outside of tubular member 22, that is, along the other side of membrane 16 to collect material passing through said membrane by dialysis and ultrafiltration in a manner which will become more apparent hereinafter.

A pump 57 connected in effluent conduit 52 comprises means for imposing a negative pressure on fluid in the circulating means. It is adapted for generating high pressure to develop flow of wash fluid through the circulating means in the direction of arrows identified as 58 at a rate which is less than that caused by pump 90, hereinafter to be further described. For minimizing costs, pump 57 develops a constant speed. However, the force, that is negative pressure, generated by pump 57 within container 30 can be selectively controlled and varied by adjusting the size of the inlet path for wash fluid through a manually operable valve 60 which is connected in influent conduit 46.

The effluent conduit has a downstream end portion 64 which is open to atmosphere and arranged in delivery association with a reservoir 62. The latter is disposed below end portion 64 and has an upper vent or opening 65 for enabling escape of gas from the spent wash fluid all of which is delivered to the reservoir. A return conduit 66, preferably vertically disposed, is mounted in fluid communication with reservoir 62 by passing through a port 70 in its bottom wall 68 in a fluid tight seal for delivery of spent wash fluid from port 70 to influent conduit 46. A horizontal overflow pipe section 72 comprising wasting means is mounted in fluid communication with reservoir 62 by passing through a port 71 in sidewall 75 of said reservoir in a fluid tight seal. Port 71 is disposed at a level spaced above bottom wall 68 to the end that a constant volume of fluid is maintained in the system. This is to say, by means which hereinafter will become apparent, the system has means for continuously adding any of selected volumes of fresh wash or dialyzing fluid to influent conduit 46. By reason of the foregoing arrangement, an equal volume of spent wash fluid will be wasted from the system through pipe 72. That portion of the spent wash fluid which is not wasted is returned to the circulating means as a component of the influent.

A reservoir 74 for fresh wash or dialyzing fluid is communicatively connected to influent conduit 46 medially of reservoir 62 and container 30 and upstream of valve 60 by means of a duct 76. Reservoir 74 may be arranged to feed into the influent conduit 46 through the downstream portion 80 of duct 76, the upstream end portion 81 of which passes through the lower wall 78 of said last reservoir in a fluid tight seal. In consequence of the foregoing construction, influent or wash fluid delivered to container 30 may comprise a mixture of spent wash fluid returned to conduit 46 through conduit 66 for circulation and fresh wash or dialyzing fluid and introduced to the circulatory system through duct 76.

Proportioning means in the form of a manually adjustable flow meter or valve 82 is connected in duct 76 medially of end portions 80 and 81 and governs the relative composition or make-up of influent, a constant volume which, varied for setting of valve 60, is drawn through container 30 under the action of pump 57. Valve 82 comprises means for varying the volume of fresh wash or dialyzing fluid added to the circulatory means at any level of negative pressure therein and valve 60 comprises means for varying the negative pressure at any rate of addition of fresh wash fluid so that in a sense the negative pressure in the system is independent of the volume of fresh wash or dialyzing fluid which is added. In consequence of the foregoing, within the limitation of the system any negative pressure can be developed at any volume of added fresh wash or dialyzing fluid.

Inasmuch as means are provided for recirculating effluent, large volumes of wash fluid may be provided with relatively great economy. To maximize the effectiveness of the system agitating means for wash fluid adjacent membrane 16 is provided. Said last means comprise a flow loop or duct 84, the major portion of which is disposed outside of container 30 and the upstream end portion 86 of which is arranged in fluid communication with chamber 28 by passing through wall 50 adjacent wall 44 in a fluid tight seal.

The downstream end portion 85 of duct 84 projects in a fluid tight seal through the bottom wall 50 and into chamber 88. A pump 90, for generating a high rate of flow, is connected in duct 84 for rapidly driving fluid in container 30 past membrane 16 in the direction of arrows 92.

Aspects of the foregoing invention are particularly significant for artificial kidney 10 which is concerned with two functions, namely, removing water from blood across membrane 16 by ultrafiltration and removal of excess solute in the blood through said membrane. The rate and quantity of desired removal of these materials is not directly related and for most efficient operation of the artificial kidney their removal from the blood should be independently controlled. That is to say, in accordance with the present invention, the rate of water removal from the blood may be controlled independently of the rate of the removal of undesired solute by reason of the features enabling selection of the level of negative pressure. On the other hand, the rate of removal of undesirable solute is controlled by the concentration of solute in the wash fluid. Such concentration depends upon the proportion of returned spent fluid and fresh wash fluid in the container and is adjustable at any negative pressure in the system.

What is claimed is:

1. In a device for passing material from one side to the other side of a selectively permeable membrane and having means defining a path for moving a first fluid containing said material on one side of said membrane, and means for circulating wash fluid on the other side of said membrane to collect material passed through said membrane, the combination comprising:

means for wasting a portion of spent wash fluid from, and returning the remainder thereof to, said circulating means;
 means for adding a quantity of fresh wash fluid to said circulating means corresponding to the portion of spent wash fluid wasted;
 means for varying the volume of fresh wash fluid added to the circulating means at any level of pressure therein, and means for varying the pressure in the circulating means at any rate of addition of fresh wash fluid.

2. A combination according to claim 1 further characterized by moving blood extracorporeally over the other surface of said membrane.

3. A combination according to claim 1 further characterized by means for imposing a negative pressure on the fluid in said circulating means.

4. A combination according to claim 3 in which the circulating means comprises:

a sealed container defining a chamber in which said membrane is disposed;
 an influent conduit communicatively connected to said container for delivering fresh dialyzing fluid and the returned portion of spent wash fluid to said chamber, and
 an effluent conduit communicatively connected to said container for removing spent wash fluid from said chamber.

5. A combination according to claim 4 further characterized in that said negative pressure imposing means is a pump connected to said effluent conduit, said effluent conduit arranged for fluid communication with said wasting means and returning means.

6. A combination according to claim 4 in which the remainder returning means comprises a reservoir in fluid receiving association with said effluent conduit and characterized in that a waste tube comprising said wasting means and a return conduit comprising said returning means are communicatively connected to said reservoir at vertically spaced apart positions.

7. A combination according to claim 6 in which the fresh dialyzing fluid adding means comprises a fresh wash fluid duct arranged in fluid communication with said influent conduit, and a valve comprising said volume varying means arranged for controlling the rate of flow in said fresh dialyzing fluid duct.

8. A combination according to claim 6 in which the reservoir is vented to atmosphere for liberation of gases from the returned spent wash fluid and is arranged for feed through said return conduit, said waste tube being disposed above said return conduit for developing a constant pressure head in said reservoir.

9. A combination according to claim 4 further characterized by additional means other than said wash fluid circulating means for agitating the fluid in said circulating means adjacent said membrane.

10. A combination according to claim 9 in which said driving means comprises a duct having a medial portion isolated from said chamber and opposite end portions arranged in fluid communication with said container for fluid circulation adjacent said membrane.

11. The combination according to claim 10 having means for pumping wash fluid through said duct to drive wash fluid past said membrane at a predetermined rate of flow.

12. A combination according to claim 10 in which the negative pressure imposing means comprises a high pressure pump connected to said effluent conduit for moving the wash fluid through said circulating means and in which said device has second pump for developing a high flow rate and connected to said duct, the rate of flow resulting from said high pressure pump being less than said high flow rate.

13. In an artificial kidney assembly having a hemodialyzing member including a dialysis and ultrafiltration membrane disposed in a sealed container, the combination comprising:

an influent conduit connected to said container for thereto delivering a returned portion of spent wash fluid and fresh dialyzing fluid;
 an effluent conduit connected to said container for receiving spent wash fluid from said container;
 a pump connected to said effluent conduit for drawing a fixed volume of fluid through said container from said influent conduit;
 proportioning means for selecting the relative volumes of the returned portion of spent wash fluid and fresh dialyzing fluid delivered to said influent conduit;
 means for wasting a quantity of spent wash fluid and returning the remainder thereof to said influent conduit;
 a duct connected to said influent conduit for supplying fresh dialyzing fluid; and
 means for varying the pressure within said container at any ratio of returned spent wash fluid and fresh dialyzing fluid in said influent conduit.

14. A combination according to claim 13 in which the proportioning means comprises an adjustable first valve arranged in said duct, said means for returning a remainder of spent wash fluid comprising a third conduit in delivery association with said influent conduit downstream of said first valve.

15. A combination according to claim 14 in which the pressure varying means comprises an adjustable second valve disposed in said influent conduit, said third conduit arranged for delivery of returned spent wash fluid upstream of said second valve.

16. A combination according to claim 15 further characterized in that said effluent conduit has a downstream end open to atmosphere, said wasting and returning means comprising a reservoir in receiving association with said effluent conduit and having a waste port and a spent wash fluid return port disposed in vertically spaced apart relationship.

17. A combination according to claim 16 characterized in that the waste port is disposed above said return port said combination having a conduit arranged for delivery of returned spent wash fluid from said return port to said influent conduit.

18. In a process for material transfer by moving a wash fluid under negative pressure in a container over one surface of a dialyzing and ultrafiltration membrane, and in which influent is drawn into and spent wash fluid as effluent is removed from said container under such negative pressure, the steps of:

wasting an adjustable portion of the effluent;
 combining the remaining portion of the effluent with fresh dialyzing fluid to provide influent for said container.

19. A combination according to claim 18 further characterized by valving the influent path to adjust the negative pressure on the wash fluid.

20. A combination according to claim 19 in which the step of combining the remaining portion of effluent with an adjustable volume of fresh dialyzing fluid includes selectively proportioning said materials at any negative pressure of the wash fluid.

21. A combination according to claim 20 further characterized by spontaneously adjusting the volume of wasted effluent to the volume of fresh dialyzing fluid added to the influent.

References Cited

Kiil et al., "Parallelflow Plastic Hemodialyser as a Membrane Oxygenator," from Trans. Amer. Soc. Art. Int. Organs, vol. VIII, received in Patent Office May 28, 1962, pp. 43–46 relied on.

Miller et al., "Automated Peritoneal Dialysis: Analysis of Several Methods of Peritoneal Dialysis," from Trans. Amer. Soc. Artif. Int. Organs, vol. XII, received in Patent Office July 6, 1966, pp. 98–105 relied on.

REUBEN FRIEDMAN, Primary Examiner

F. A. SPEAR, JR., Assistant Examiner

U.S. Cl. X.R.

210—321